United States Patent
Moon et al.

(10) Patent No.: US 12,477,889 B2
(45) Date of Patent: Nov. 18, 2025

(54) DISPLAY DEVICE

(71) Applicant: SAMSUNG DISPLAY CO., LTD., Yongin-si (KR)

(72) Inventors: Gyeong-Ub Moon, Yongin-si (KR); Chul Kim, Yongin-si (KR); Jongyeop An, Yongin-si (KR); Hyeon Jun Lee, Yongin-si (KR); Boram Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 172 days.

(21) Appl. No.: 18/354,781

(22) Filed: Jul. 19, 2023

(65) Prior Publication Data

US 2024/0138168 A1    Apr. 25, 2024
US 2024/0237375 A9    Jul. 11, 2024

(30) Foreign Application Priority Data

Oct. 19, 2022    (KR) .................. 10-2022-0135105

(51) Int. Cl.
| | | |
|---|---|---|
| *G06V 40/13* | (2022.01) | |
| *A61B 5/00* | (2006.01) | |
| *A61B 5/024* | (2006.01) | |
| *A61B 5/1172* | (2016.01) | |
| *G06V 40/145* | (2022.01) | |
| *H10K 39/34* | (2023.01) | |
| *H10K 59/80* | (2023.01) | |

(52) U.S. Cl.
CPC ........ *H10K 39/34* (2023.02); *A61B 5/02416* (2013.01); *A61B 5/1172* (2013.01); *A61B 5/6898* (2013.01); *G06V 40/1318* (2022.01); *G06V 40/145* (2022.01); *H10K 59/8792* (2023.02)

(58) Field of Classification Search
None
See application file for complete search history.

(56) References Cited

U.S. PATENT DOCUMENTS

| | | | |
|---|---|---|---|
| 2010/0245556 A1* | 9/2010 | Kanda .................... | H04N 23/50 348/E7.091 |
| 2021/0150178 A1* | 5/2021 | Wang ................ | G06V 40/1388 |
| 2021/0383089 A1* | 12/2021 | Ye ........................ | G06V 10/143 |
| 2022/0037406 A1 | 2/2022 | Kubota et al. | |
| 2022/0039697 A1* | 2/2022 | Higano ................. | G02B 6/005 |
| 2022/0075980 A1 | 3/2022 | Lee et al. | |

FOREIGN PATENT DOCUMENTS

| | | |
|---|---|---|
| KR | 10-2098657 | 4/2020 |
| KR | 10-2022-0007082 | 1/2022 |
| KR | 10-2022-0031804 | 3/2022 |

* cited by examiner

Primary Examiner — Joseph R Haley
(74) Attorney, Agent, or Firm — F. CHAU & ASSOCIATES, LLC

(57) ABSTRACT

A display device includes a base layer and a display element layer. The base layer includes a first area and a second area, and the display element layer is disposed on the base layer. In addition, the display element layer includes a first light sensor disposed in the first area and operating at a first operation frequency; and a second light sensor disposed in the second area and operating at a second operation frequency higher than the first operation frequency.

24 Claims, 13 Drawing Sheets

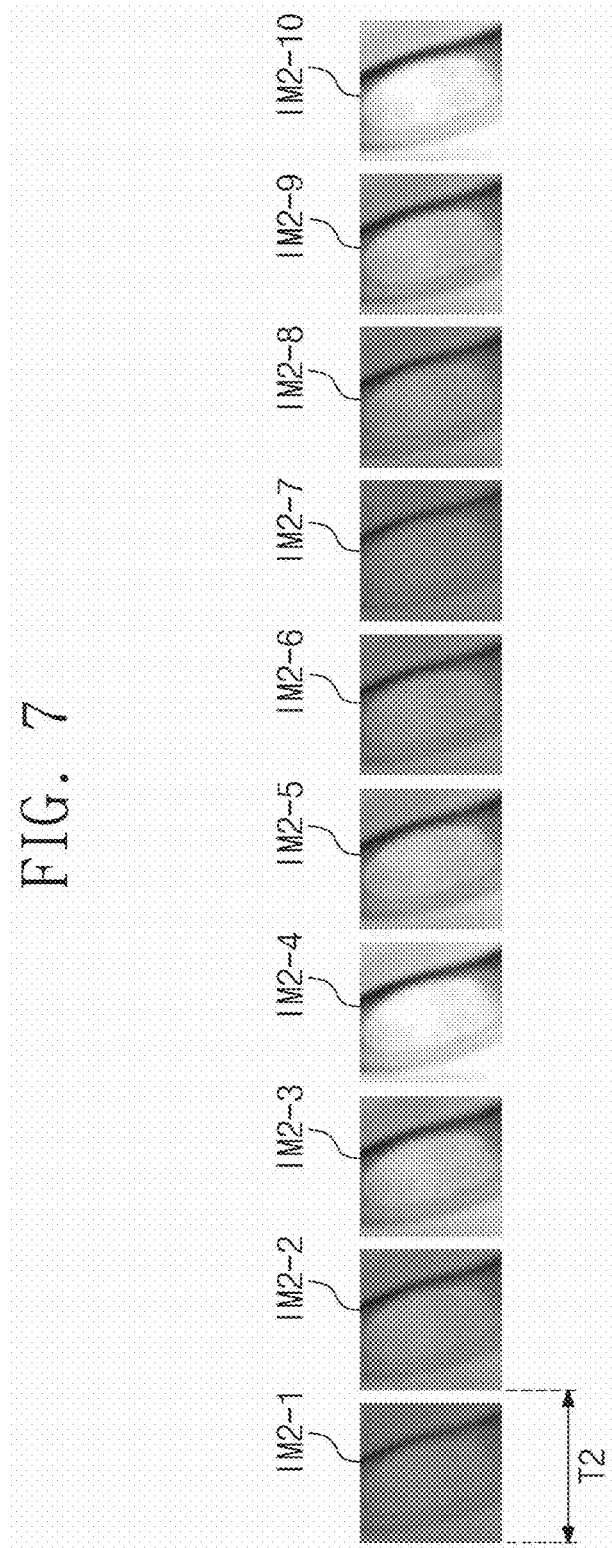

DISPLAY DEVICE

CROSS-REFERENCE TO RELATED APPLICATIONS

This application claims priority under 35 U.S.C. § 119 to Korean Patent Application No. 10-2022-0135105, filed on Oct. 19, 2022, in the Korean Intellectual Property Office, the disclosure of which is incorporated by reference herein in its entirety.

BACKGROUND

1. Technical Field

One or more embodiments described herein relate to a display device.

2. Related Art

A variety of multimedia electronic devices have been developed. Examples include televisions, mobile phones, tablet computers, navigation devices, and game consoles. Each of these devices may include a display device for displaying images and an input sensing device for detecting an external input. More recent devices include a function of detecting fingerprints.

Fingerprints may be detected using, for example, a capacitance-based scheme, which detects changes in capacitance generated between electrodes. Fingerprints may also be detected using a light-sensing scheme, which detects incident light using a light sensor. Other schemes for detecting fingerprints include an ultrasonic-wave-based scheme, which senses vibrations using a piezoelectric material, etc. In a light-sensing scheme, the light sensor may be, for example, a fingerprint sensor, a PPG (photoplethysmography) sensor, or a blood pressure sensor.

SUMMARY

According to an embodiment, a display device includes a base layer including a first area and a second area, and a display element layer disposed on the base layer, wherein the display element layer includes a first light sensor disposed in the first area and operating at a first operation frequency, and a second light sensor disposed in the second area and operating at a second operation frequency higher than the first operation frequency.

The first light sensor may be configured to sense fingerprint information, and the second light sensor may be configured to sense pulse information.

The display device may further include a light-blocking layer disposed on the display element layer, wherein a first opening overlapping the first light sensor may be provided in the light-blocking layer.

A second opening overlapping the second light-sensor may be provided in the light-blocking layer, wherein a first width of the first opening may be less than a second width of the second opening.

The display deice may further include a light-blocking layer disposed on the display element layer, wherein the light-blocking layer may overlap at least one of the first light sensor or the second light sensor.

The display deice may further include a first color filter overlapping with the first light sensor in a plan view, wherein the first color filter may be configured to transmit light of a first wavelength band therethrough, and a second color filter overlapping with the second light sensor in the plan view, wherein the second color filter may be configured to transmit light of a second wavelength band therethrough, wherein the first wavelength band may be shorter than the second wavelength band.

The first wavelength band may be in a range of about 380 nm to about 570 nm.

The second wavelength band may be in a range of about 600 nm to about 1000 µm.

An amount of light received by the second light sensor may be greater than an amount of light received by the first light sensor.

A first resolution of a first image acquired by the first light sensor may be higher than a second resolution of a second image acquired by the second light sensor.

The first operation frequency may be in a range of about 1 Hz to about 10 Hz.

The second operation frequency may be in a range of about 30 Hz to about 500 Hz.

According to an embodiment, a display device includes a display panel including a plurality of light-emitting areas, a plurality of sensing areas, and a peripheral area surrounding the plurality of light-emitting areas and the plurality of sensing areas, and an optical layer disposed on the display panel. The display panel includes a base layer having a first area and a second area defined therein, and a display element layer disposed on the base layer, wherein the display element layer includes a plurality of light-emitters respectively disposed in the plurality of light-emitting areas, a first light sensor disposed in a first sensing area among the plurality of sensing areas and operating at a first operation frequency, and a second light sensor disposed in a second sensing area among the plurality of sensing areas and operating at a second operation frequency higher than the first operation frequency.

The optical layer may include a light-blocking layer disposed on the display panel, wherein a plurality of openings may be provided in the light-blocking layer, wherein the plurality of openings may respectively overlap at least some of the plurality of light-emitting areas and the plurality of sensing areas.

The plurality of openings in the light-blocking layer may include a first opening overlapping the first light sensor and a second opening overlapping the second light sensor, wherein a first width of the first opening may be smaller than a second width of the second opening.

The display deice may further include a first color filter overlapping with the first light sensor in a plan view, wherein the first color filter may be configured to transmit light of a first wavelength band therethrough, and a second color filter overlapping with the second light sensor in the plan view, wherein the second color filter may be configured to transmit light of a second wavelength band therethrough, wherein the first wavelength may be shorter than the second wavelength. The first wavelength band.

The first wavelength band may be in a range of about 380 nm to about 570 nm, and the second wavelength band may be in a range of about 600 nm to about 1000 µm.

An amount of light received by the second light sensor may be less greater than an amount of light received by the first light-sensing element.

A first resolution of a first image acquired by the first light sensor may be higher than a second resolution of a second image acquired by the second light sensor.

The first operation frequency may be in a range of about 1 Hz to about 10 Hz, and the second operation frequency may be in a range of about 30 Hz to about 500 Hz.

According to an embodiment, a display device includes a plurality of pixels; a first light sensor at a first position of a display area; and a second light sensor at a second position of the display area, wherein the first light sensor is configured to be driven based on one or more first operating parameters and the second light sensor is configured to be driven based on one or more second operating parameters different from the one or more first operating parameters.

The first frequency may correspond to a still image, and the second frequency may correspond to a moving image. The first light sensor may capture images at the first frequency, and the second light sensor may capture images at the second frequency which is greater than the first frequency.

The one or more first operating parameters includes a first frequency, and the one or more second operating parameters includes a second frequency different from the first frequency. The one or more first operating parameters include a first resolution, and the one or more second operating parameters include a second resolution different from the first resolution. The first light sensor is disposed to receive less light than the second light sensor. The first light sensor is to detect biometric information, and the second light sensor is to detect medical information of a user. The biometric information includes a fingerprint, and the medical information includes blood-based information.

BRIEF DESCRIPTION OF THE FIGURES

The above and other objects and features of the present disclosure will become apparent by describing in detail embodiments thereof with reference to the accompanying drawings.

FIG. 7 provides photographs illustrating a plurality of second images acquired by a second light-sensing element according to an embodiment of the present disclosure.

DETAILED DESCRIPTION

Figure 1:
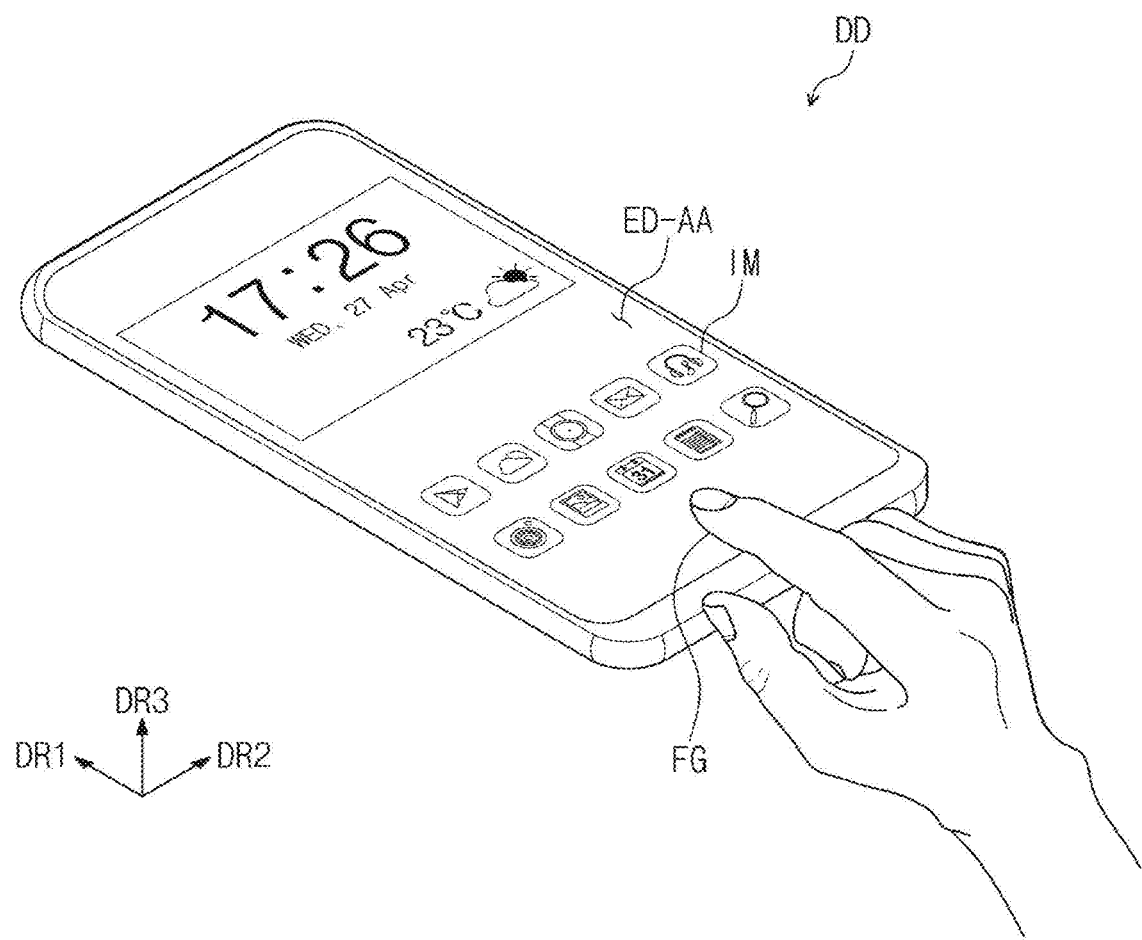
FIG. 1 is a perspective view of a display device according to an embodiment of the present disclosure.

As used herein, when a component (or a region, a layer, a portion, and the like) is referred to as being "on", "connected to", or "coupled to" another component, it means that the component may be directly disposed/connected/coupled on another component or a third component may be disposed between the component and another component.

Like reference numerals refer to like components. In addition, in the drawings, thicknesses, ratios, and dimensions of components are exaggerated for effective description of technical content. "and/or" includes all of one or more combinations that the associated components may define.

Terms such as first, second, and the like may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to drawings.

FIG. 1 is a perspective view of a display device DD according to an embodiment of the present disclosure. The display device DD may be activated based on an electrical signal to display images. For example, the display device DD may be included in large-sized devices (such as televisions and billboards), as well as small and medium-sized devices such as monitors, mobile phones, tablet computers, navigation devices, and game consoles. The above examples of the display device DD are merely examples. The present disclosure is not limited thereto as long as any example of the display device does not deviate from the concept of the present disclosure. In this embodiment, an example is discussed herein the display device DD is embodied in a mobile phone.

Referring to FIG. 1, the display device DD may have a predetermined shape, e.g., a rectangular shape having long sides extending in a first direction DR1 and short sides extending in a second direction DR2 intersecting the first direction DR1 in a plan view. However, the present disclosure is not limited thereto, and the display device DD may have various shapes such as a circle, a polygon, or another shape in a plan view.

In one embodiment, the display device DD may be flexible. The term "flexible" may include, for example, a property that allows at least a portion of the device to be bent. The flexible device may include any structure, e.g., from a structure in which the device is entirely foldable to a structure in which the device is bendable by a slight amount, e.g., several nanometers. In one embodiment, the flexible display device DD may include a curved display device or a foldable display device. However, the present disclosure is not limited thereto, and the display device DD may be a rigid device in other embodiments.

The display device DD may display an image IM through a display area ED-AA. The display area ED-AA of the display device DD may be parallel to a plane extending in the first direction DR1 and the second direction DR2. The display area ED-AA may display the image IM in a third direction DR3 substantially perpendicular to the plane extending in the first direction DR1 and the second direction DR2. In one example, the display area ED-AA is shown to be flat as an example. However, in an embodiment, the display area ED-AA may have a curved shape bent from at least one side of a flat face in another embodiment.

In one example, a front face (or a top face) and a rear face (or a bottom face) of each of the members constituting the display device DD may be opposed to each other in the third direction DR3. A normal direction to each of the front face and the rear face may be substantially extend in the third direction DR3. A spacing between the front face and the rear face as defined along the third direction DR3 may correspond to a thickness of each member (or each unit).

As used herein, "a plan view" may include a view in the third direction DR3. As used herein, "a cross-sectional view" may be include a view in the first direction DR1 or the second direction DR2. In one example, a direction indicated by each of the first to third directions DR1, DR3, and DR3 may be a relative concept and thus may be expressed as other directions.

The images IM displayed by the display device DD may include still images and moving images. In FIG. 1, a watch window with accompanying icons are shown as examples of one type of image IM that may be displayed. A face on which images IM are displayed may correspond to a front face of the display device DD and may correspond to a front face of a window WM.

The display device DD according to an embodiment may detect an external input. The external input may include various types of inputs provided. For example, the external input may include an applied force, an applied pressure, a temperature, light, etc. For example, the external input may include, for example, not only a contact input of an object (e.g., the user's hand or a pen) with the display device DD, but also an input (e.g., non-contact hovering) which is applied in close proximity to the display device DD or in an adjacent manner to the display device DD at a predefined spacing.

The display device DD of an embodiment may detect a user's input on the front face of the display area ED-AA and may respond to the detected input signal. However, an area of the display device DD that detects the external input is not limited to the front face of the display device DD. In one embodiment, the user's input applied to a side face or rear face of the display device DD may be detected, for example, according to the design of the display device DD. Thus, the present disclosure is not limited to one embodiment.

The display device DD of an embodiment may detect biometric information (e.g., a user's fingerprint FG) that is externally applied. A fingerprint recognition area may be disposed in the active area ED-AA of the display device DD. The fingerprint recognition area may be disposed in an entirety of the active area ED-AA or in a portion of the active area ED-AA.

Figure 2:
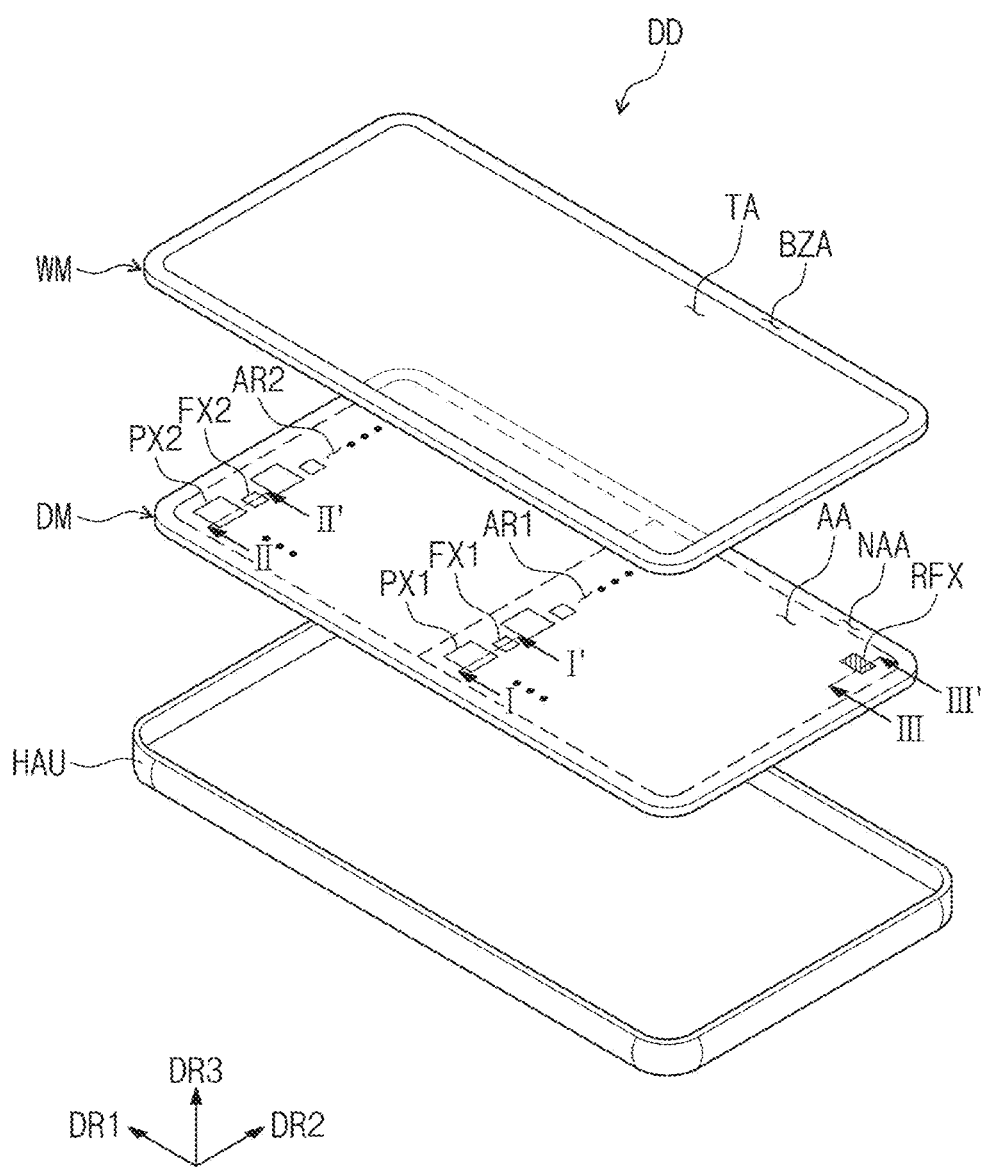
FIG. 2 is an exploded perspective view of a display device according to an embodiment of the present disclosure.

FIG. 2 is an exploded perspective view of the display device DD according to an embodiment of the present disclosure.

Referring to FIG. 2, the display device DD may include the window WM, a display module DM, and a housing HAU. A combination of the window WM and the housing HAU may determine an exterior appearance of the display device DD and may provide an inner space that may accommodate therein the components of the display device DD.

The window WM may be disposed on the display module DM. The window WM may have a shape corresponding to that of the display module DM. The window WM may cover an entirety of an outer face of the display module DM, and may protect the display module DM from external shocks, scratches, and debris.

The window WM may include an optically clear insulating material. For example, the window WM may include a glass substrate or a polymeric substrate. In an embodiment, the window WM may include a tempered glass substrate. The window WM may have a single-layer or multi-layer structure. The window WM may further include functional layers such as an anti-fingerprint layer, a phase control layer, and/or a hard coating layer disposed on the optically clear substrate.

The front face of the window WM may correspond to a display face of the display device DD. The front face of the window WM may include a transmission area TA and a bezel area BZA. The transmission area TA of the window WM may be an optically clear area. The window WM may transmit images IM provided from the display module DM through the transmission area TA, to thereby allow a user to view the images IM. The transmission area TA of the window WM may correspond to the display area ED-AA of the display device DD.

The bezel area BZA of the window WM may be provided as an area in which a material including a predefined color is printed. The bezel area BZA of the window WM may prevent a component of the display module DM overlapping the bezel area BZA from being visually recognized from an external perspective.

The bezel area BZA may be adjacent to the transmission area TA. A shape of the transmission area TA may be substantially determined by the bezel area BZA. For example, the bezel area BZA may be disposed outside the transmission area TA so as to partially or entirely surround the transmission area TA. For example, in one embodiment the bezel area BZA may be adjacent to only one side of the transmission area TA or may be omitted altogether. Further, the bezel area BZA may be disposed in a side face rather than the front face of the display device DD. The display module DM may be disposed between the window WM and the housing HAU. The display module DM may display images according to an electrical signal and may transmit and receive information based on external inputs.

The display module DM may be divided into an active area AA and a peripheral area NAA. The active area AA may be activated according to an electrical signal. The active area AA may be a portion that displays an image or detects an external input. According to an embodiment, the active area AA of the display module DM may correspond to the above-described transmission area TA. As used herein, the concept of "A area/portion and B area/portion correspond to each other" may include the case where "A area/portion and B area/portion overlap each other," but is not limited to a configuration that A area/portion and B area/portion have the same area size and/or the same shape.

The peripheral area NAA may be adjacent to the active area AA. For example, the peripheral area NAA may partially or completely surround the active area AA. However, the present disclosure is not limited thereto, and the peripheral area NAA may have various other shapes. The peripheral area NAA may be an area which includes a drive circuit or drive wiring for driving the active area AA, various signal lines providing electrical signals, and/or pads. The peripheral area NAA of the display module DM may correspond to the above-mentioned bezel area BZA. The bezel area BZA may prevent the components of the display module DM disposed in the peripheral area NAA from being externally recognized from an outside point of view.

The housing HAU may be disposed under the display module DM and may accommodate the display module DM therein. The housing HAU may absorb external impact and may prevent foreign debris and materials/moisture from penetrating into the display module DM, thereby protecting the display module DM. In an embodiment, the housing HAU may have a structure that includes a plurality of connected accommodating members.

In one example, the display device DD may further include an electronic module including various functional modules for operating the display module DM, a power supply module that supplies power for the display device DD, and a bracket that is coupled to the display module DM and/or housing HAU to divide an inner space of the display device DD into various sub-spaces.

The display module DM may include a first area AR1 and a second area AR2. The display module DM may include a plurality of pixels PX disposed in the active area AA, and a plurality of sensors FX1 and FX2 and a reference sensor RFX disposed in the active area AA. Each of the plurality of sensors FX1 and FX2 may include, for example, a fingerprint sensor, a PPG (photoplethysmography) sensor, a blood pressure sensor, a luminance sensor, or a proximity sensor.

The plurality of sensors FX1 and FX2 may include a first sensor FX1 and a second sensor FX2. The first sensor FX1 may be disposed in the first area AR1, and the second sensor FX2 may be disposed in the second area AR2. The reference sensor RFX may be disposed in an area where a bio-signal is not sensed.

Each of the plurality of sensors FX1 and FX2 may be disposed between two adjacent pixels PX. In one embodiment, the plurality of pixels PX and the plurality of sensors FX1 and FX2 may be alternately arranged in each of the first and second directions DR1 and DR2. However, the present disclosure is not limited thereto. That is, two or more pixels PX may be disposed between two sensors FX1 and FX2 adjacent to each other in the first direction DR1 among the plurality of sensors FX1 and FX2, or two or more pixels PX may be disposed between two sensors FX1 and FX2 adjacent to each other in the second direction DR2 among the plurality of sensors FX1 and FX2.

Figure 3:
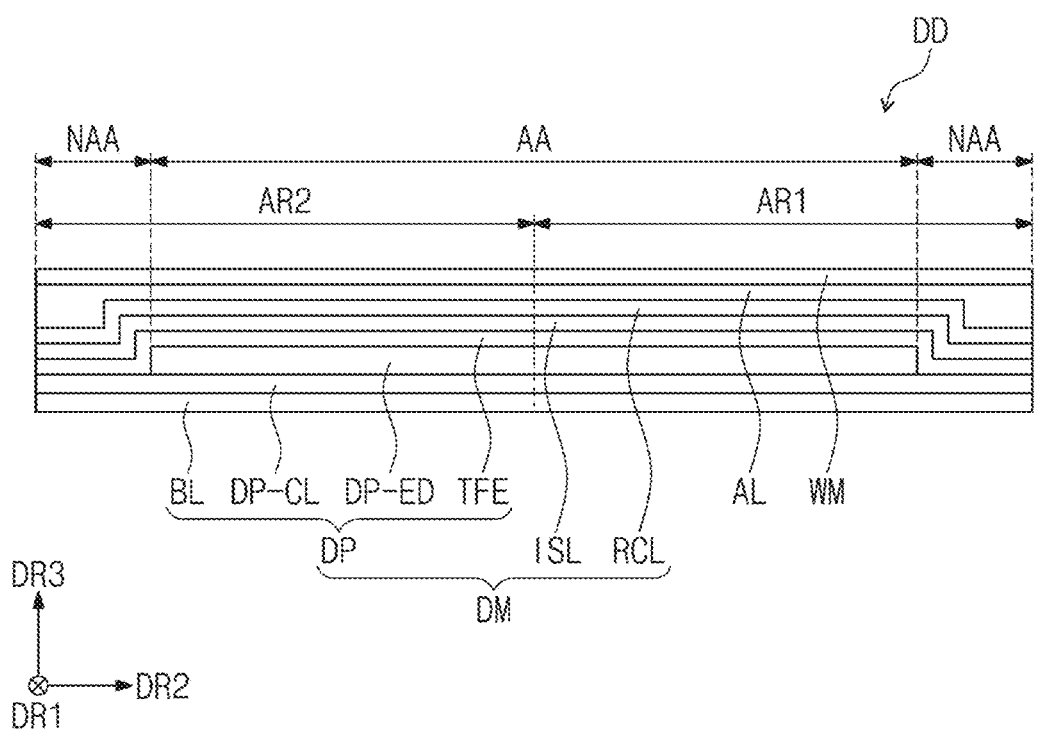
FIG. 3 is a cross-sectional view of a display device according to an embodiment of the present disclosure.

FIG. 3 is a cross-sectional view of the display device DD according to an embodiment of the present disclosure.

Referring to FIG. 3, the display module DM may include a display panel DP, an input sensing layer ISL, and an optical layer RCL. The display panel DP may include a base layer BL, a circuit element layer DP-CL, a display element layer DP-ED, and an encapsulation layer TFE.

The display panel DP may substantially generate images. For example, the display panel DP may be a light-emitting type display panel. However, the present disclosure is not particularly limited thereto. In one or more embodiments, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include quantum dots, quantum rods, or etc. Hereinafter, an example in which the display panel DP is embodied as the organic light-emitting display panel is described.

The display panel DP may include the base layer BL, the circuit element layer DP-CL, the display element layer DP-ED, and the encapsulation layer TFE. The display panel DP according to the present disclosure may be a flexible display panel. However, the present disclosure is not limited thereto. For example, the display panel DP may be a foldable display panel that is foldable around one or more folding axes, or may be a rigid display panel.

The base layer BL may provide a base face on which the circuit element layer DP-CL is disposed. The base layer BL may include, for example, a glass substrate, a metal substrate, a polymer substrate or an organic/inorganic composite substrate. The base layer BL may include the first area AR1 and the second area AR2 previously mentioned.

The circuit element layer DP-CL may be disposed on the base layer BL. The circuit element layer DP-CL may include at least one insulating layer, a circuit element, signal lines, and/or signal pads. The circuit element layer DP-CL may include a pixel drive circuit included in each of the plurality of pixels for displaying an image, a sensor drive circuit included in each of the plurality of sensors for recognizing external information, etc. The external information may be biometric information. In one example of the present disclosure, the sensor may be a fingerprint recognition sensor, a proximity sensor, an iris recognition sensor, or the like. Further, the sensor may be an optical sensor that recognizes biometric information in an optical scheme. The circuit element layer DP-CL may further include signal lines connected to the pixel drive circuit and/or the sensor drive circuit.

The display element layer DP-ED may be disposed on the circuit element layer DP-CL. The display element layer DP-ED may include a plurality of light-emitting elements (e.g., light emitters) ED1 and ED2 (e.g., refer to FIGS. 4 and 6) overlapping the active area AA. The light-emitting elements ED1 and ED2 of the display element layer DP-ED may be respectively connected to the circuit elements of the circuit element layer DP-CL to constitute the pixels PX (e.g., refer to FIG. 2). Each of the pixels PX may output light through the active area AA in response to the drive signal.

The display element layer DP-ED may include a plurality of light-sensing elements (e.g., light sensors) OPD1 and OPD2 (e.g., refer to FIGS. 4 and 6) disposed to overlap with the active area AA. Each of the light-sensing elements OPD1 and OPD2 may be a light sensor that senses light incident toward the light-sensing element and converts a light signal into an electrical signal. For example, the light-sensing element may be a photodiode. An example configuration of the display element layer DP-ED will be described in detail with reference to the following drawings.

The encapsulation layer TFE may be disposed on the display element layer DP-ED to seal the display element layer DP-ED. The encapsulation layer TFE may include at least one organic film and at least one inorganic film. The inorganic film may include an inorganic material to protect the display element layer DP-ED from moisture/oxygen. The inorganic film may include a silicon nitride layer, a silicon oxy nitride layer, a silicon oxide layer, a titanium oxide layer, or an aluminum oxide layer. However, the present disclosure is not particularly limited thereto. The organic layer may include an organic material to protect the display element layer DP-ED from foreign materials such as dust particles. For example, one or more thin-films of the encapsulation layer TFE may be disposed to improve optical efficiency of elements of the display element layer DP-ED or to protect the elements thereof.

The input sensing layer ISL may be disposed on the display panel DP. The input sensing layer ISL may be directly disposed on the encapsulation layer TFE. (As used herein, A and B being formed via a consecutive process without a separate adhesive layer or adhesive member may be expressed as "A being directly disposed on B". For example, the expression "the input sensing layer ISL is directly disposed on the display panel DP" means that the display panel DP is formed, and then, the input sensing layer ISL is formed on a base face of the display panel DP via a consecutive process without a separate adhesive layer.)

In one example, the present disclosure is not limited thereto. The input sensing layer ISL may be coupled to the display panel DP via an adhesive layer. The input sensing layer ISL may be manufactured via a process separate from a manufacturing process of the display panel DP, and then may be fixed to a top face of the display panel DP by an adhesive layer.

The input sensing layer ISL may sense an external input and acquire coordinate information of the external input. The input sensing layer ISL may operate in various schemes such as a capacitance-based scheme, a resistance-film-based scheme, an infrared-based scheme, an acoustic-wave-based scheme, or a pressure-based scheme. However, the present disclosure is not limited thereto. For example, the input sensing layer ISL may operate in the capacitance-based scheme and may include a plurality of sensing electrodes for sensing the external input. The input sensing layer ISL may provide an input signal corresponding to the external input to the display panel DP, and the display panel DP may generate an image corresponding to the input signal.

The optical layer RCL may be disposed on the input sensing layer ISL. The optical layer RCL may be disposed directly or indirectly on the input sensing layer ISL. For example, the optical layer RCL may be formed by coating (or printing) a composition of the optical layer RCL directly on a base face of the input sensing layer ISL.

The optical layer RCL may reduce reflectance of external light incident from outside of the display device DD. The optical layer RCL may include a light-blocking layer BM (e.g., refer to FIG. 4) and one or more color filters CF1 and CF2 (e.g., see FIG. 4 and FIG. 6). A detailed description of a configuration of an example of the optical layer RCL will be described later.

The display device DD may further include an adhesive layer AL (e.g., see FIG. 3) disposed between the display module DM and the window WM. The display module DM and the window WM may be coupled to each other via the adhesive layer AL, interposed therebetween. The adhesive layer AL may include a transparent adhesive such as an optically clear adhesive film (an OCA film), an optically clear adhesive resin (OCR), or a pressure-sensitive adhesive (PSA) film. However, the type of the adhesive included in the adhesive layer AL is not limited thereto.

Figure 4:
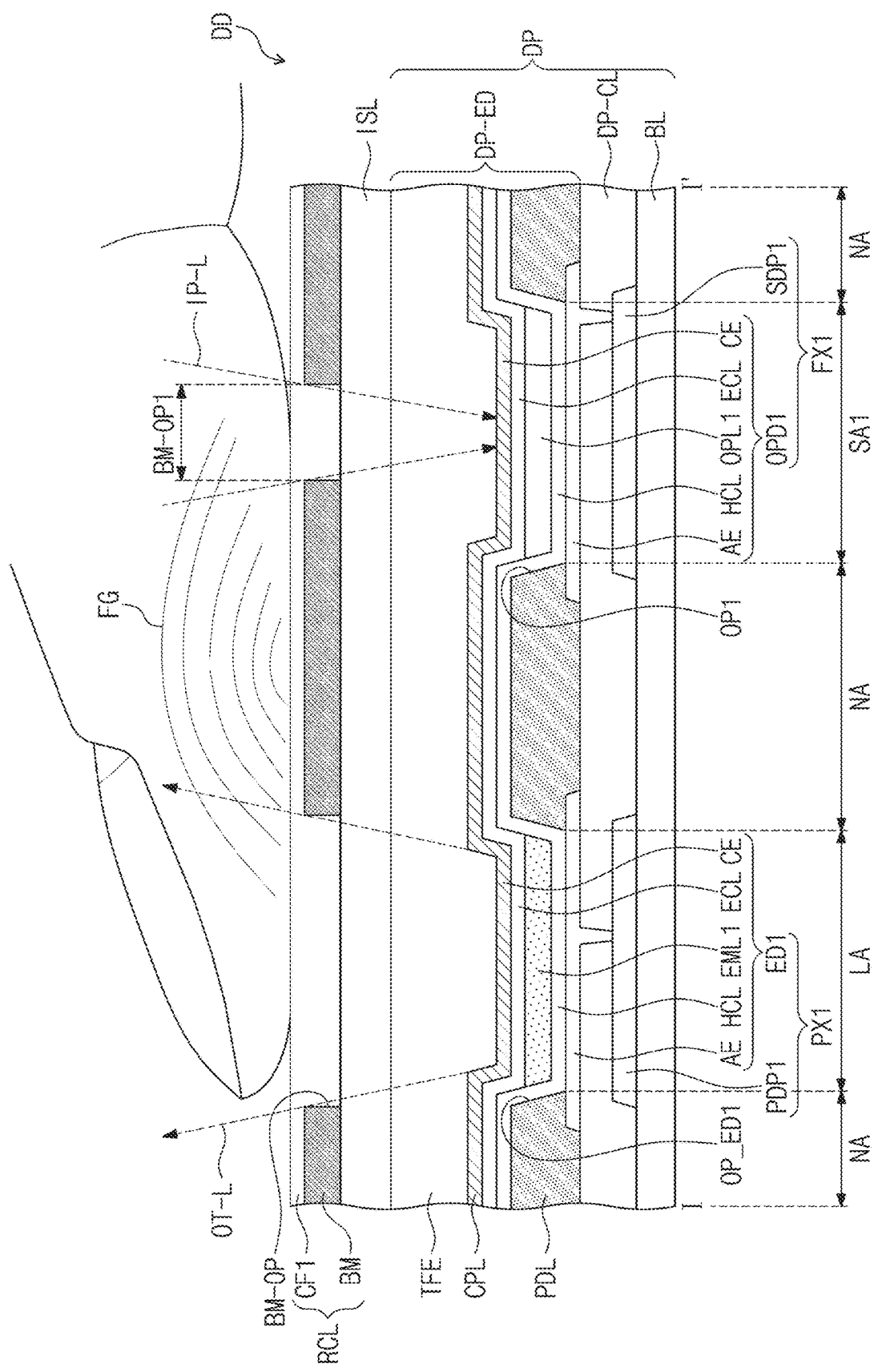
FIG. 4 is a cross-sectional view of a portion of a display device as cut along a cutting line I-I' of FIG. 2.

FIG. 4 is a cross-sectional view of a portion of the display device DD taken along section line I-I' of FIG. 2. FIG. 4 shows a state in which the first sensor FX1 recognizes a fingerprint as one example of the biometric information input from the user's hand. In describing FIG. 4, the description will be made with reference to FIGS. 2 and 3, and redundant descriptions thereof will be omitted.

Referring to FIGS. 2 to 4, the display panel DP may include a plurality of light-emitting areas LA, a plurality of sensing areas SA1 and SA2 (e.g., refer to FIG. 6), and a peripheral area NA. The peripheral area NA may partially or completely surround the plurality of light-emitting areas LA and the plurality of sensing areas SA1 and SA2. The light-emitting elements ED1 and ED2 (e.g., refer to FIG. 6) may be respectively disposed in the light-emitting areas LA. FIG. 4 shows the first light-emitting element ED1 among the plurality of light-emitting elements ED1 and ED2 by way of example.

The display element layer DP-ED may include the first light-sensing element OPD1 of the first sensor FX1, the first light-emitting element ED1 of the first pixel PX1, a pixel defining film PDL, and a capping layer CPL.

The first pixel PX1 may include the first light-emitting element ED1 and a first pixel driver PDP1. The first light-emitting element ED1 may be embodied as an organic light-emitting element or a quantum dot light-emitting element. However, an embodiment is not limited thereto, e.g., the first light-emitting element ED1 may be another type of light-emitting element in another embodiment that can generate light or can control emission of an amount of light, according to an electrical signal.

The first sensor FX1 may include the first light-sensing element OPD1 and a first sensor driver SDP1. The first light-sensing element OPD1 may be disposed in the first sensing area SA1 among the plurality of sensing areas SA1 and SA2 (e.g., refer to FIG. 6). The first light-sensing element OPD1 may operate at a predetermined (first) operation frequency.

The first light-sensing element OPD1 may be a light sensor that recognizes light in a visible light region as reflected by the external object, e.g., the finger of a user. In an embodiment, the first light-sensing element OPD1 may be a biometric sensor that recognizes light reflected from a fingerprint of the user and converts a corresponding light signal into an electrical signal. For example, the first light-sensing element OPD1 may be configured to sense fingerprint information.

Light OT-L emitted from the first light-emitting element ED1 may be reflected from an external object FG (e.g., a fingerprint) and may be incident, as reflected light IP-L, on the first light-sensing element OPD1. The reflected light IP-L incident on the first light-sensing element OPD1 may be light in the visible light region. For example, the reflected light IP-L may be a predetermined color of light, e.g., green or another color of light. The first light-sensing element OPD1 may receive the reflected light IP-L and convert the same into an electrical signal and then may recognize the external input based on the electrical signal. An operation state of the display device DD may be changed based on the recognizing result.

In one embodiment, the first light-sensing element OPD1 may include an anode AE, a hole control layer HCL, a first photoelectric conversion layer OPL1, an electron control layer ECL, and a cathode CE. The first light-sensing element OPD1 may be disposed in the first area AR1 (e.g., refer to FIG. 2).

The anode AE may be disposed on the circuit element layer DP-CL. The anode AE may be exposed through a first pixel defining film opening OP1 in the pixel defining film PDL. The anode AE may be made of a metal material, a metal alloy, or a conductive compound. However, the material and characteristics of the anode AE are not limited thereto. For example, the anode AE may operate as a pixel electrode or a sensing electrode. The anode AE may be embodied as a transmissive electrode, a transflective electrode, or a reflective electrode. When the anode AE is embodied as the transmissive electrode, the anode may be made of a transparent metal oxide, e.g., ITO (indium tin oxide), IZO (indium zinc oxide), ZnO (zinc oxide), or ITZO (indium tin zinc oxide). When the anode AE is embodied as a transflective electrode or a reflective electrode, the anode may be made of Ag, Mg, Cu, Al, Pt, Pd, Au, Ni, Nd, Jr, Cr, Li, Ca, LiF/Ca, LiF/Al, Mo, Ti, W or a compound or a mixture thereof (e.g., a mixture of Ag and Mg).

The hole control layer HCL may be disposed on the anode AE and the pixel defining film PDL. The hole control layer HCL may include a single layer made of a single material, a single layer made of a plurality of different materials, or a multi-layer structure in which a plurality of layers respectively made of a plurality of different materials are stacked. For example, the hole control layer HCL may have a single layer structure of a hole injection layer or a hole transport layer, or may have a single layer structure composed of a hole injection material and a hole transport material. In an embodiment, the hole control layer HCL may include a hole transport layer and may further include a hole injection layer.

The first photoelectric conversion layer OPL1 may be disposed on the hole control layer HCL. The first photoelectric conversion layer OPL1 may include a light-receiving material that converts light into an electrical signal. In an embodiment, the first photoelectric conversion layer OPL1 may include an organic light-receiving material. However, the material constituting the first photoelectric conversion layer OPL1 may be different in another embodiment. For example, the first photoelectric conversion layer OPL1 may include an organic polymer material as a light-receiving material. In one embodiment, the first photoelectric conversion layer OPL1 may include a conjugated polymer. In one embodiment, the first photoelectric conversion layer OPL1 may include a thiophene-based conjugated polymer, a benzodithiophene-based conjugated polymer, a TPD (thieno[3,4-c]pyrrole-4,6-dione)-based conjugated polymer, a DPP (diketo-pyrrole-pyrrole)-based conjugated polymer, a BT (benzothiadiazole)-based conjugated polymer, or another material.

The electron control layer ECL may be disposed on the first photoelectric conversion layer OPL1, a first light-emitting layer EML1, and the hole control layer HCL. For example, the electron control layer ECL may be integrally formed therewith. The electron control layer ECL may include a single layer made of a single material, a single layer made of a plurality of different materials, or a multi-layer structure having a stack of a plurality of layers respectively made of a plurality of different materials. For example, the electron control layer ECL may have a single layer structure of an electron injection layer or an electron transport layer, or may have a single layer structure composed of an electron injection material and an electron transport material. Further, the electron control layer ECL may have a structure of a single layer made of a plurality of different materials, or may include a stack structure of a plurality of layers that are sequentially stacked on the light-emitting layer. In an embodiment, the electron control layer ECL may include an electron transport layer and may further include an electron injection layer.

The cathode CE may be disposed on the electron control layer ECL. The cathode CE and the electron control layer ECL may be formed simultaneously through the same process. For example, the cathode CE may be integrally formed therewith. The cathode CE may operate as a common electrode. However, the cathode CE is not limited thereto. For example, the cathode CE may be embodied as a transmissive electrode, a transflective electrode or a reflective electrode. When the cathode CE is embodied as the transmissive electrode, the cathode may include a transparent metal oxide, e.g., ITO (indium tin oxide), IZO (indium zinc oxide), ZnO (zinc oxide), or ITZO (indium tin zinc oxide). When the cathode CE is embodied as the transflective electrode or the reflective electrode, the cathode may made of Ag, Mg, Cu, Al, Pt, Pd, Au, Ni, Nd, Jr, Cr, Li, Ca, LiF/Ca, LiF/Al, Mo, Ti, W or a compound or mixture thereof (e.g., a mixture of Ag and Mg).

The first sensor driver SDP1 may be disposed on the circuit element layer DP-CL. The first sensor driver SDP1 may include a sensor drive circuit electrically connected to the first light-sensing element OPD1 to drive the first light-sensing element OPD1. Each first sensor driver SDP1 may be connected, in a one-to-one manner, to respective ones of the plurality of light-sensing elements OPD1 and OPD2 (e.g., refer to FIG. 6). However, the present disclosure is not limited thereto, and one first sensor driver SDP1 may be connected to at least two light-sensing elements OPD1 and OPD2 in another embodiment.

The first light-emitting element ED1 may include an anode AE, a hole control layer HCL, a first light-emitting layer EML1, an electron control layer ECL, and a cathode CE. The anode AE, hole control layer HCL, electron control layer ECL, and cathode CE may be identical, in structure and/or materials, to the anode AE, the hole control layer HCL, the electron control layer ECL, and the cathode CE of the first light-sensing element OPD1.

The first light-emitting layer EML1 may be disposed on the hole control layer HCL. The first light-emitting layer EML1 may be a light-emitting layer of a predetermined color, e.g., green or another color. However, the present disclosure is not particularly limited thereto. The first light-emitting layer EML1 may include an organic material and/or an inorganic material. The first light-emitting layer EML1 may generate colored light. The first light-emitting layer EML1 may include an organic light-emitting material or a quantum dot material.

The first pixel driver PDP1 may be disposed on the circuit element layer DP-CL. The first pixel driver PDP1 may include a pixel drive circuit electrically connected to the first light-emitting element ED1 to drive the first light-emitting element ED1. The first pixel driver PDP1 may be connected, in a one-to-one manner, to respective ones of the plurality of light-emitting elements ED1 and ED2 (e.g., refer to FIG. 6).

The pixel defining film PDL may be disposed on the circuit element layer DP-CL. The first pixel defining film opening OP1 and a first light-emitting opening OP_ED1 may be in the pixel defining film PDL. The first photoelectric conversion layer OPL1 may be disposed in the first pixel defining film opening OP1, and the first light-emitting layer EML1 may be disposed in the first light-emitting opening OP_ED1.

In an embodiment of the present disclosure, the pixel defining film PDL may further include a black material. For example, the pixel defining film PDL may further include black organic dyes/pigments such as carbon black or aniline black. The pixel defining film PDL may be formed, for example, by mixing a blue organic material and a black organic material with each other. The pixel defining film PDL may further contain a liquid-repellent organic material.

The capping layer CPL may be disposed on the cathode CE and may cover the cathode CE.

Figure 6:
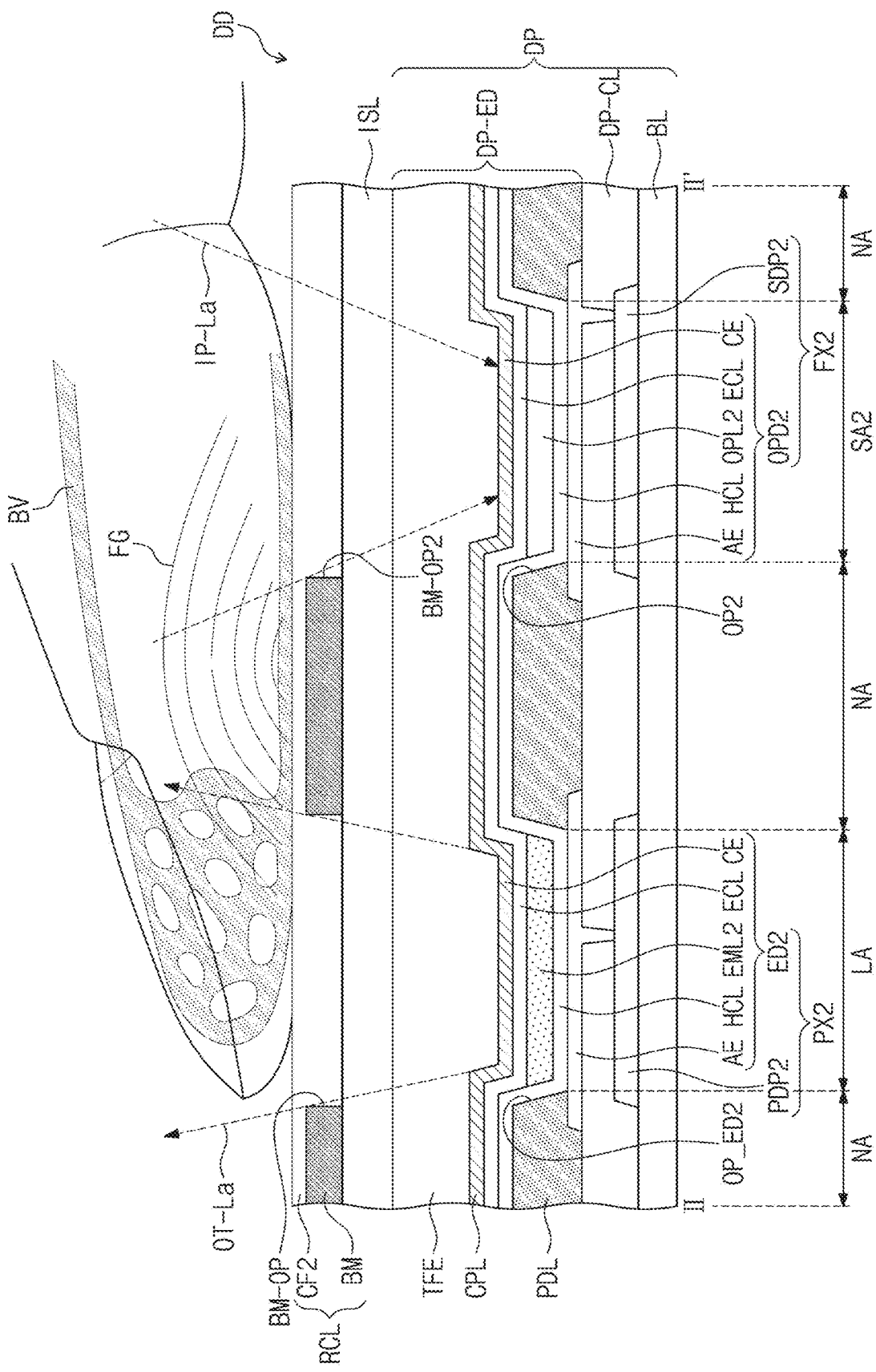
FIG. 6 is a cross-sectional view of a portion of a display device as cut along a cutting line II-IT of FIG. 2.

The optical layer RCL may include the light-blocking layer BM and a plurality of color filters CF1 and CF2 (e.g., refer to FIG. 6). The plurality of color filters CF1 and CF2 may include the first color filter CF1 and the second color filter CF2 (e.g., refer to FIG. 6). The plurality of color filters CF1 and CF2 may include, for example, a red color filter, a green color filter, and a blue color filter. The first color filter CF1 is shown in FIG. 4. The first color filter CF1 may overlap with the first light-sensing element OPD1. For example, the first color filter CF1 may overlap with the first area AR1 in a plan view. The first color filter CF1 may transmit light in a first wavelength band therethrough. The first wavelength band may be in a predetermined range, a non-limiting example of which is about 380 nm to about 570 nm. The first wavelength band may corresponding to a different range of wavelengths in another embodiment.

The light-blocking layer BM may be disposed on the display element layer DP-ED. The first color filter CF1 may be disposed on the light-blocking layer BM and the input sensing layer ISL, and may cover the light-blocking layer BM. The light-blocking layer BM prevents light leakage and may act as a boundary between adjacent color filters of different colors.

In one embodiment, the light-blocking layer BM may include a black matrix. For example, the light-blocking layer BM may include an organic pigment or dye. The light-blocking layer BM may include an organic light-blocking material or an inorganic light-blocking material containing a black pigment or a black dye. The light-blocking layer BM may be made of a light-blocking composition including, for example, propylene glycol monomethyl ether acetate, 3-methoxybutyl acetate, and/or organic black pigment. Further, the light-blocking layer BM may overlap with the pixel defining film PDL.

In the light-blocking layer BM, a plurality of openings BM-OP, BM-OP1, and BM-OP2 (e.g., refer to FIG. 6) may be included. The plurality of openings BM-OP, BM-OP1, and BM-OP2 may respectively overlap at least some of the plurality of light-emitting areas LA and the plurality of sensing areas SA1 and SA2 (e.g., refer to FIG. 6). In one embodiment, the plurality of openings BM-OP, BM-OP1, and BM-OP2 may include a plurality of upper openings BM-OP, the first opening BM-OP1, and the second opening BM-OP2.

FIG. 4 shows a cross section of a portion of the first area AR1 (e.g., refer to FIG. 2), the upper opening BM-OP and the first opening BM-OP1 by way of example. The upper opening BM-OP may be provided to overlap with the first light-emitting element ED1, and the first opening BM-OP1 may be provided to overlap with the first light-sensing element OPD1.

Figure 5:
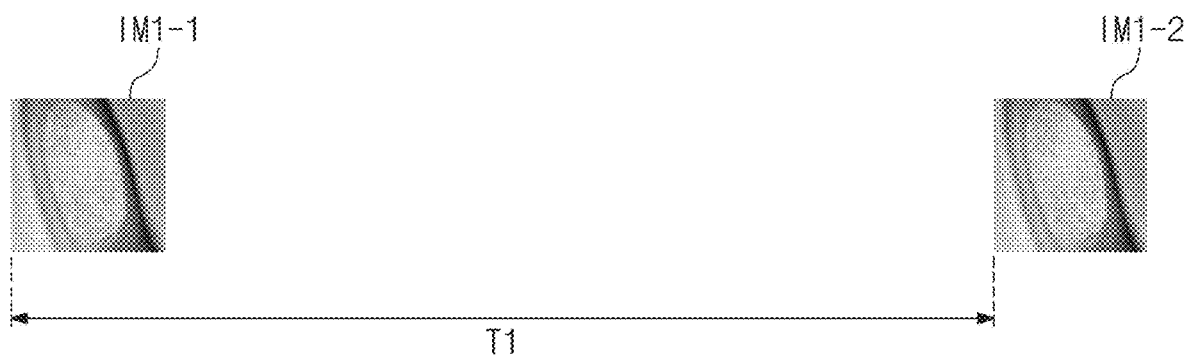
FIG. 5 shows photographs illustrating a plurality of first images acquired by a first light-sensing element according to an embodiment of the present disclosure.

FIG. 5 shows photographs illustrating a plurality of first images IM1-1 and IM1-2 acquired by the first light-sensing element OPD1 (e.g., refer to FIG. 4) according to an embodiment of the present disclosure.

Referring to FIGS. 4 and 5, the plurality of first images IM1-1 and IM1-2 may be acquired by the first light-sensing element OPD1. The first light-sensing element OPD1 may operate at the first operation frequency. The first operation frequency may be in a predetermined range, e.g., 1 Hz to 10 Hz.

For example, when the first operation frequency is 1 Hz, one image may be acquired for 1 second. For example, a time interval T1 between a time at which the first-first image IM1-1 is acquired and a time at which the first-second image IM1-2 is acquired may be 1 second. Further, when the first operation frequency is 10 Hz, 10 images may be acquired for 1 second. For example, the time interval T1 between a time at which the first-first image IM1-1 is acquired and a time at which the first-second image IM1-2 is acquired may be 0.1 second. The first operation frequency may be in a different range in another embodiment.

FIG. 6 is a cross-sectional view of a portion of the display device DD taken along section line II-IT of FIG. 2. FIG. 6 shows a state in which the second sensor FX2 measures the PPG as one type of biometric information. In describing FIG. 6, the description will be made with reference to FIGS. 2 and 4, and descriptions about the components having the same reference numerals are omitted.

Referring to FIGS. 4 and 6, the display element layer DP-ED may include the second light-sensing element OPD2 of the second sensor FX2, the second light-emitting element ED2 of the second pixel PX2, the pixel defining film PDL, and the capping layer CPL.

The second pixel PX2 may include the second light-emitting element ED2 and a second pixel driver PDP2. The second light-emitting element ED2 and the second pixel driver PDP2 may be substantially the same as the first light-emitting element ED1 and the first pixel driver PDP1.

The second sensor FX2 may include the second light-sensing element OPD2 and a second sensor driver SDP2. The second light-sensing element OPD2 may be disposed in the second sensing area SA2, among the plurality of sensing areas SA1 and SA2. The second light-sensing element OPD2 may operate at a second operation frequency. In one embodiment, the second operation frequency may be higher than the first operation frequency.

The second light-sensing element OPD2 may be a light sensor that recognizes light in a predetermined wavelength range, e.g., visible light or infrared light, reflected from a bio-signal. The amount of light as absorbed may vary based on the amount of blood flowing through a blood vessel BV in the user's finger. Accordingly, the second light-sensing element OPD2 may be a biometric sensor that detects a change in blood volume based on a measuring result of the light amount as absorbed. For example, the second light-sensing element OPD2 may be configured to sense pulse information. The second sensor driver SDP2 may operation in substantially the same manner as the first sensor driver SDP1.

Light OT-La emitted from the second light-emitting element ED2 may be reflected from the blood vessel BV and then may be incident, as reflected light IP-La, on the second light-sensing element OPD2. The reflected light IP-La incident on the second light-sensing element OPD2 may be light in the predetermined range previously indicated, e.g., in the visible light region or infrared light region. For example, when the reflected light IP-La is light in the visible light region, the reflected light IP-La may be red light. The second light-sensing element OPD2 may receive the incident reflected light IP-La and may convert the same into an electrical signal and may receive biometric information based on the electrical signal.

The second light-sensing element OPD2 may include an anode AE, a hole control layer HCL, a second photoelectric conversion layer OPL2, an electron control layer ECL, and a cathode CE. The second light-sensing element OPD2 may be disposed in the second area AR2 (e.g., refer to FIG. 2). The anode AE, the hole control layer HCL, the second photoelectric conversion layer OPL2, the electron control layer ECL, and the cathode CE of the second light-sensing element OPD2 may substantially the same as the anode AE, the hole control layer HCL, the first photoelectric conversion layer OPL1, the electron control layer ECL, and the cathode CE of the first light-sensing element OPD1 previously described.

The second light-emitting element ED2 may include an anode AE, a hole control layer HCL, a second light-emitting layer EML2, an electron control layer ECL, and a cathode CE. The anode AE, the hole control layer HCL, the second light-emitting layer EML2, the electron control layer ECL, and the cathode CE of the second light-emitting element ED2 may be substantially the same as the anode AE, the hole control layer HCL, the first light-emitting layer EML1, the electron control layer ECL, and the cathode CE of the first light-emitting element ED1 previously described.

The pixel defining film PDL may be disposed on the circuit element layer DP-CL. A second pixel defining film opening OP2 and a second light-emitting opening OP_ED2 may be in the pixel defining film PDL. The second photoelectric conversion layer OPL2 may be disposed in the second pixel defining film opening OP2, and the second light-emitting layer EML2 may be disposed in the second light-emitting opening OP_ED2.

The optical layer RCL may include the light-blocking layer BM and the plurality of color filters, e.g., CF1 and CF2. The plurality of color filters may include a red color filter, a green color filter, and/or a blue color filter. FIG. 6 shows the second color filter CF2 as an example. The second color filter CF2 may overlap with the second light-sensing element OPD2. For example, the second color filter CF2 may overlap with the second area AR2 in a plan view. The second color filter CF2 may transmit light in a second wavelength band therethrough. In one embodiment, wavelengths in the second wavelength band may be shorter than wavelengths in the first wavelength band. For example, the second wavelength band may be in a range of about 600 nm to about 1000 μm, although the second wavelength band may include a different range of frequencies in another embodiment.

The light-blocking layer BM may include a plurality of upper openings BM-OP, the first opening BM-OP1, and the second opening BM-OP2. FIG. 6 shows a cross section of a portion of the second area AR2 (e.g., refer to FIG. 2) with the upper opening BM-OP and the second opening BM-OP2 by way of example. The upper opening BM-OP may overlap with the second light-emitting element ED2, and the second opening BM-OP2 may overlap with the second light-sensing element OPD2.

FIG. 7 shows a plurality of second images IM2-1, IM2-2, IM2-3, IM2-4, IM2-5, IM2-6, IM2-7, IM2-8, IM2-9, and IM2-10 as acquired by the second light-sensing element OPD2 (e.g., refer to FIG. 6) according to an embodiment of the present disclosure.

Referring to FIGS. 6 and 7, the plurality of second images IM2-1, IM2-2, IM2-3, IM2-4, IM2-5, IM2-6, IM2-7, IM2-8, IM2-9, and IM2-10 may be acquired by the second light-sensing element OPD2. The second light-sensing element OPD2 may operate at the second operation frequency. The second operation frequency may be higher than the first operation frequency. The second operation frequency may be in a predetermined range, e.g., about 30 Hz to about 500 Hz.

For example, when the second operation frequency is 30 Hz, 30 images may be acquired for one second. In this case, a time interval T2 between a time at which the second-first image IM2-1 is acquired and a time at which the second-second image IM2-2 is acquired may be ⅟30 second. Further, when the second operation frequency is 500 Hz, 500 images may be acquired for one second. In this case, the time interval T2 between a time at which the second-first image IM2-1 is acquired and a time at which the second-second image IM2-2 is acquired may be ⅟500 second. In FIG. 7, the time interval T2 is defined as a time duration between a time at which the second-first image IM2-1 is acquired and a time at which the second-second image IM2-2 is acquired. However, the present disclosure is not limited thereto. For example, the time interval T2 may be defined as a time duration between times corresponding to two consecutive second images, among the plurality of second images IM2-1, IM2-2, IM2-3, IM2-4, IM2-5, IM2-6, IM2-7, IM2-8, IM2-9, and IM2-10.

Figure 8A:
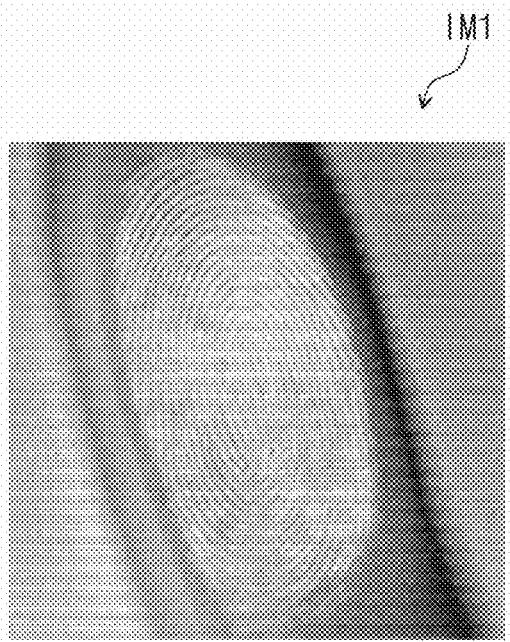
FIG. 8A provides photographs illustrating a first image acquired by a first light-sensing element according to an embodiment of the present disclosure, and FIG. 8B provides photographs illustrating a second image acquired by a second light-sensing element according to an embodiment of the present disclosure.
Figure 8B:
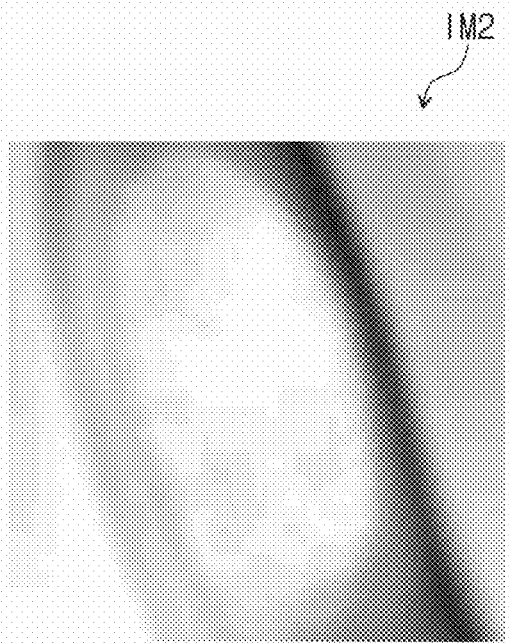

FIG. 8A is a diagram illustrating a first image IM1 acquired by the first light-sensing element OPD1 (e.g., refer to FIG. 4) according to an embodiment of the present disclosure. FIG. 8B is a diagram illustrating a second image IM2 acquired by the second light-sensing element OPD2 (e.g., refer to FIG. 6) according to an embodiment of the present disclosure.

Referring to FIGS. 4, 6, 8A and 8B, a first resolution of the first image IM1 may be higher than a second resolution of the second image IM2. In the first area AR1 where the first light-sensing element OPD1 is disposed, the first opening BM-OP1 of the light-blocking layer BM may have a relatively small width. In the second area AR2 where the second light-sensing element OPD2 is disposed, the width of the second opening BM-OP2 of the light-blocking layer BM may be larger. Therefore, the second area AR2 has a higher transmittance than that of the first area AR1. Thus, an amount of light by which the second area AR2 receives may be greater than the amount of light which the first area AR1 receives. Thus, the second area AR2 may have a lower resolution than that of the first area AR1.

Because the second light-sensing element OPD2 measures PPG based on a sensing result indicating a change in the amount of absorbed light resulting from a varying blood flow rate, a relatively low resolution image may be captured by the second light-sensing element OPD2. However, because the blood flow should be instantaneously sensed by the second light-sensing element OPD2, the second light-sensing element OPD2 may operate at a higher second operation frequency. Because the first light-sensing element OPD1 senses a shape of a fingerprint, a relatively higher resolution image may be captured by the first light-sensing element OPD1.

Figure 9:
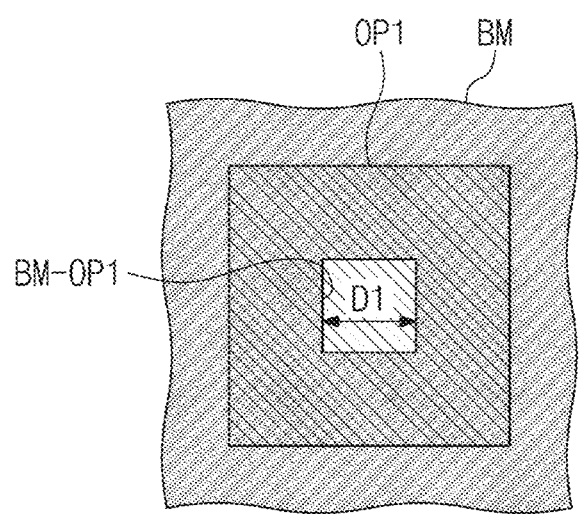
FIG. 9 is a diagram showing a portion of an anode of the first light-sensing element exposed through a first pixel defining film opening.
Figure 10A:
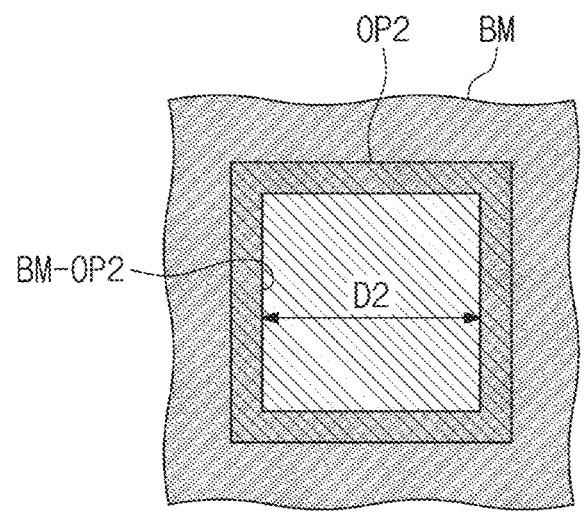
FIGS. 10A to 10C are views showing a portion of an anode of a second light-sensing element exposed through a second pixel defining film opening according to an embodiment of the present disclosure.
Figure 10B:
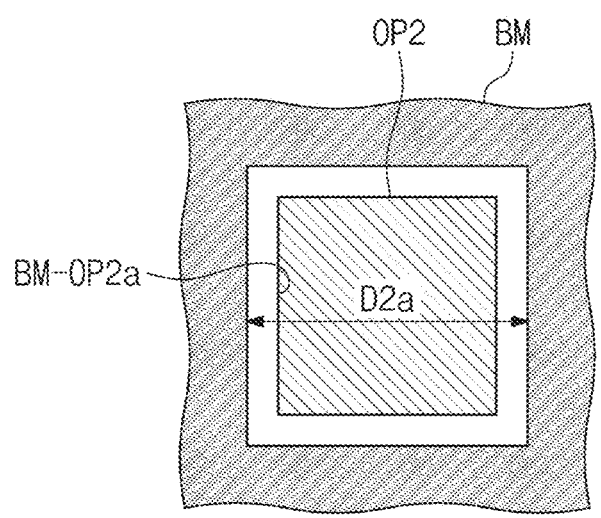
Figure 10C:
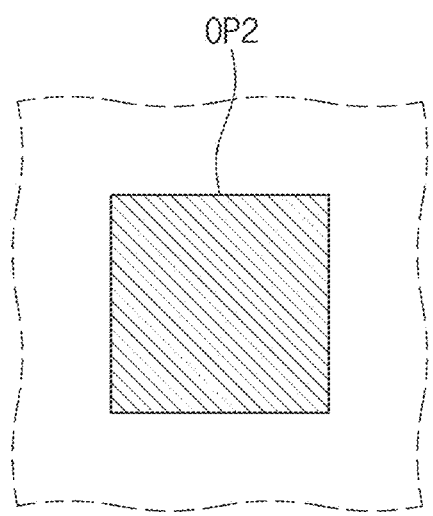

FIG. 9 is a diagram showing a portion of the anode AE (e.g., refer to FIG. 4) of the first light-sensing element OPD1 exposed through the first pixel defining film opening OP1 according to an embodiment. FIG. 10A to FIG. 10C are views showing portions of the anode AE (e.g., refer to FIG. 6) of the second light-sensing element OPD2 exposed through the second pixel defining film opening OP2 according to one or more embodiments.

Referring to FIG. 9, a portion of each of the light-blocking layer BM, the first opening BM-OP1, and the first pixel defining film opening OP1 is shown. In the light-blocking layer BM, the first opening BM-OP1 overlapping with the first light-sensing element OPD1 (e.g., refer to FIG. 4) may be provided. The first light-sensing element OPD1 senses a fingerprint and thus acquires a high-resolution still image. Thus, resolution may be an important factor in the first light-sensing element OPD1. Therefore, a width D1 of the first opening BM-OP1 receiving light may be relatively smaller.

Referring to FIG. 10A, a portion of each of the light-blocking layer BM, the second opening BM-OP2, and the second pixel defining film opening OP2 is shown. The second opening BM-OP2 which overlaps with the second light-sensing element OPD2 (e.g., refer to FIG. 6) may be provided in the light-blocking layer BM. The second light-sensing element OPD2 senses the PPG and thus may obtain a moving image. A high transmittance may be provided for the second light-sensing element OPD2. Therefore, the width D2 of the second opening BM-OP2 receiving light may be relatively larger.

Referring to FIGS. 4, 6, 9, and 10A, the first width D1 of the first opening BM-OP1 may be less than the second width D2 of the second opening BM-OP2. Accordingly, the amount of light received by the second light-sensing element OPD2 may be greater than the amount of light received by the first light-sensing element OPD1.

Referring to FIG. 10B, a portion of each of the light-blocking layer BM, a second opening BM-OP2a, and the second pixel defining film opening OP2 is shown. In an embodiment, the second opening BM-OP2a may be formed to be relatively larger than the second pixel defining film opening OP2. The width D2a of the second opening BM-OP2a may be larger than the width D2 of the second opening BM-OP2 in FIG. 10A. Because the second opening BM-OP2a is wider, a larger amount of light may be received therethrough.

Referring to FIGS. 6 and 10C, the light-blocking layer BM may not be disposed in an area adjacent to the second pixel defining film opening OP2. For example, in an embodiment, the second opening BM-OP2a (e.g., refer to FIG. 10B) is formed to be relatively wider, so that the light-blocking layer BM is not disposed adjacent to the second light-sensing element OPD2. In one embodiment, the light-blocking layer BM may not be disposed in the area adjacent to the second pixel defining film opening OP2, and the second opening BM-OP2a (e.g., refer to FIG. 10B) overlapping with the second pixel defining film opening OP2 and arranged by a closed curve may not be provided. In this case, the second pixel defining film opening OP2 may receive a relatively larger amount of light.

FIGS. 4, 6, and 9 to FIG. 10C show the first opening BM-OP1 and the second openings BM-OP2 and BM-OP2a of various sizes. However, the sizes of the first opening BM-OP1, and the second openings BM-OP2 and BM-OP2a are not limited thereto. For example, the first width D1 of the first opening BM-OP1 may be larger than the width of the first pixel defining film opening OP1 in other embodiments.

According to the present disclosure, the structure of the optical layer RCL (which overlaps with each of the sensors FX1 and FX2) may be adapted based on operations to be performed by the sensors FX1 and FX2. For example, the sensors may include a first sensor FX1 that acquires the high resolution image IM1 at a low frequency (speed) and the second sensor FX2 that acquires the low resolution image IM2 at a higher frequency (speed).

Moreover, the width D1 of the first opening BM-OP1 of the optical layer RCL overlapping the first sensor FX1 may be different from the width D2 of the second opening BM-OP2 of the optical layer RCL overlapping the second sensor FX2. Accordingly, the structure of the optical layer RCL may be adapted to satisfy the requirements of the operation of each of the sensors FX1 and FX2. As a result, sensing efficiency of each of the sensors FX1 and FX2 may be improved.

For example, because the width D1 of the first opening BM-OP1 is less than the width D2 of the second opening BM-OP2, the first sensor FX1 may acquire a high-resolution image IM1, while the fingerprint sensing accuracy acquired by the first sensor FX1 may be improved. Further, as the width D2 of the second opening BM-OP2 is larger than the width D1 of the first opening BM-OP1, the second sensor FX2 may receive a relatively larger amount of light, thereby improving the accuracy of information about the change in the blood flow rate.

Figure 11A:
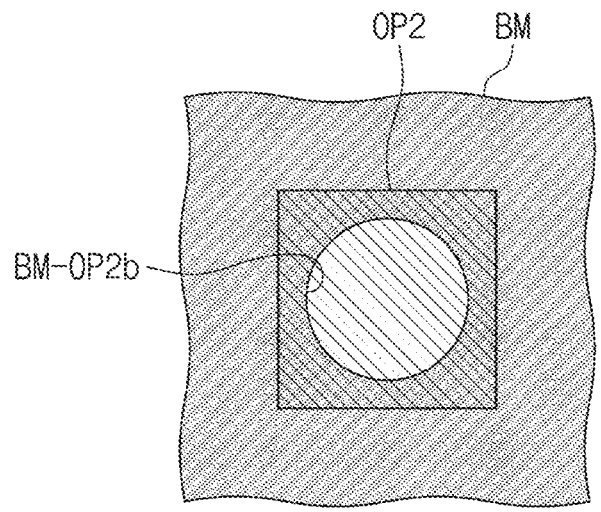
FIGS. 11A and 11B are views showing a portion of an anode of a second light-sensing element exposed through a second pixel defining film opening according to an embodiment of the disclosure.
Figure 11B:
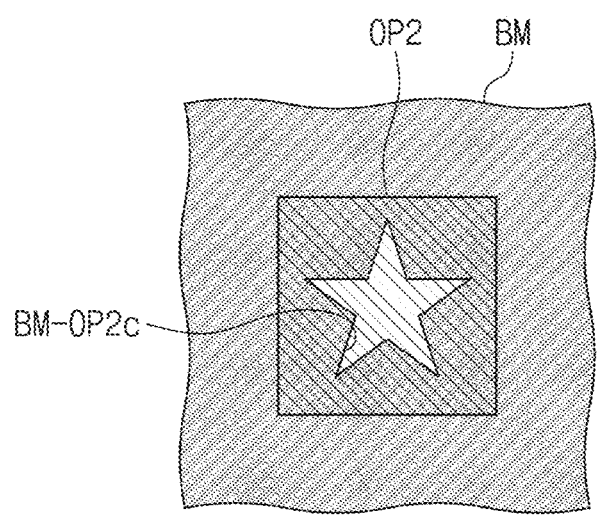

FIGS. 11A and 11B are views showing examples of a portion of the anode AE (refer to FIG. 6) of the second light-sensing element OPD2 exposed through the second pixel defining film opening OP2.

Referring to FIG. 11A, a portion of each of the light-blocking layer BM, a second opening BM-OP2b, and the second pixel defining film opening OP2 is shown. In an embodiment, the second opening BM-OP2b may be formed in a circular shape rather than a square shape.

Referring to FIG. 11B, a portion of each of the light-blocking layer BM, a second opening BM-OP2c, and the second pixel defining film opening OP2 is shown. In an embodiment, the second opening BM-OP2c may be formed in a star shape rather than a square shape.

In FIGS. 11A and 11B, the circular and star shapes of the second openings BM-OP2b and BM-OP2c are shown by way of example. However, the shapes of the second openings BM-OP2b and BM-OP2c are not limited thereto. The shapes of the second openings BM-OP2b and BM-OP2c may be modified to have different shapes (than a circle or star) according to the function and a shape of the second sensor FX2 (e.g., refer to FIG. 6). Further, in FIGS. 11A and 11B, only the various shapes of the second openings BM-OP2b and BM-OP2c are illustrated. However, the first opening BM-OP1 and the upper opening BM-OP may have various different shapes in other embodiments.

Figure 12:
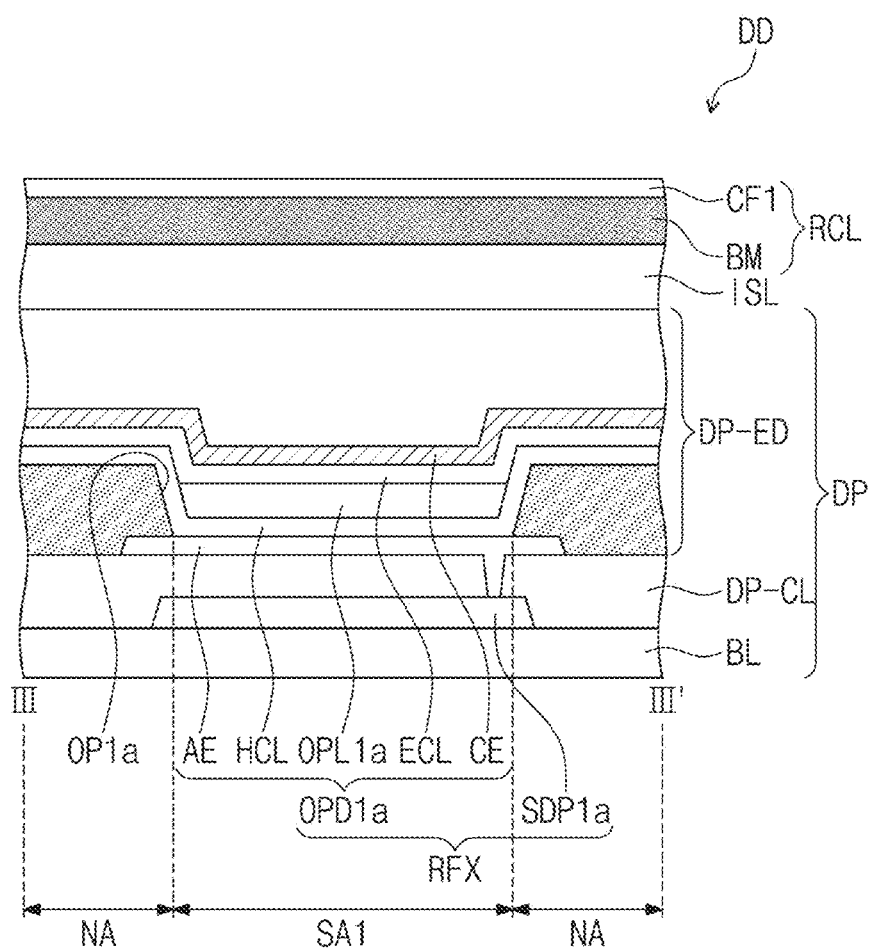
FIG. 12 is a cross-sectional view of a portion of a display device as cut along a cutting line III-III' in FIG. 2.

FIG. 12 illustrates an example of a cross-sectional view of a portion of the display device DD taken along section line III-III' in FIG. 2. In describing FIG. 12, reference to FIG. 4 will be made and redundant descriptions of the components having the same reference numerals are omitted.

Referring to FIGS. 4, 6, and 12, the reference sensor RFX may include a first light-sensing element OPD1a and a first sensor driver SDP1a. FIG. 12 shows that the reference sensor RFX includes the first light-sensing element OPD1a by way of example. However, the present disclosure is not limited thereto. For example, the reference sensor RFX may include the second light-sensing element OPD2. Each of the first light-sensing element OPD1a and the first sensor driver SDP1a of the reference sensor RFX may have substantially the same configuration as the first light-sensing element OPD1 and the first sensor driver SDP1 of the first sensor FX1.

The reference sensor RFX may have substantially the same configuration as the first sensor FX1 and the second sensor FX2, except for the configuration of the light-blocking layer BM. For example, an opening may not be formed in a portion of the light-blocking layer BM overlapping the reference sensor RFX. For example, the light-blocking layer BM may overlap with at least one of the first light-sensing element OPD1 or the second light-sensing element OPD2. The overlapping first light-sensing element OPD1 or the overlapping second light-sensing element OPD2 may be referred to as the reference sensor RFX.

The reference sensor RFX may not receive light due to the light-blocking layer BM. Because the reference sensor RFX does not receive light, the same data as acquired in an environment (e.g., such as a dark room) may be acquired by the reference sensor RFX. The data acquired from the reference sensor RFX may be compared with a data value acquired from the first sensor FX1 or the second sensor FX2. The reference sensor RFX may therefore be used to remove the need to perform an experiment in order to obtain a darkroom data value.

According to one or more of the foregoing embodiments, the structure of an optical layer overlapping with sensors located in a display area may be adapted based on the operations to be performed by the sensors. For example, the sensors may include the first sensor that acquires a high resolution image at a low frequency (speed) and the second sensor that acquires a low resolution image at a high frequency (speed). The width of the first opening of the optical layer overlapping the first sensor may be different from a width of the second opening of the optical layer overlapping the second sensor. Accordingly, the structure of the optical layer may be adapted to conditions that are based on the differing operations of the sensors. As a result, sensing efficiency of the sensors may be improved.

While the present disclosure has been described with reference to embodiments thereof, it will be apparent to those of ordinary skill in the art that various changes and modifications may be made thereto without departing from the spirit and scope of the present disclosure as set forth in the following claims. The embodiments may be combined to form additional embodiments.

What is claimed is:

1. A display device comprising:
a base layer including a first area and a second area;
a display element layer disposed on the base layer and including a plurality of pixels; and
a light-blocking layer disposed on the display element layer,
wherein the display element layer includes:
a first light sensor disposed in the first area and operating at a first operation frequency; and
a second light sensor disposed in the second area and operating at a second operation frequency higher than the first operation frequency,
wherein the light-blocking layer includes:
a first opening disposed above the first light sensor; and
a second opening disposed above the second light sensor,
wherein a width of the first opening is less than a width of the second opening, and the first and second openings are spatially separate.

2. The display device of claim 1, wherein:
the first light sensor is configured to sense fingerprint information, and
the second light sensor is configured to sense pulse information.

3. The display device of claim 1,
wherein the light-blocking layer overlaps at least one of the first light sensor or the second light sensor.

4. The display device of claim 1, further comprising:
a first color filter overlapping with the first light sensor in a plan view, the first color filter is configured to transmit light of a first wavelength band therethrough; and
a second color filter overlapping with the second light sensor in the plan view, wherein the second color filter is configured to transmit light of a second wavelength band therethrough, wherein the first wavelength band is shorter than the second wavelength band.

5. The display device of claim 4, wherein the first wavelength band is in a range of about 380 nm to about 570 nm.

6. The display device of claim 4, wherein the second wavelength band is in a range of about 600 nm to about 1000 μm.

7. The display device of claim 1, wherein an amount of light received by the second light sensor is greater than an amount of light received by the first light sensor.

8. The display device of claim 1, wherein a first resolution of a first image acquired by the first light sensor is higher than a second resolution of a second image acquired by the second light sensor.

9. The display device of claim 1, wherein the first operation frequency is in a range of about 1 Hz to about 10 Hz.

10. The display device of claim 1, wherein the second operation frequency is in a range of about 30 Hz to about 500 Hz.

11. A display device comprising:
a display panel including a plurality of light-emitting areas, a plurality of sensing areas, and a peripheral area surrounding the plurality of light-emitting areas and the plurality of sensing areas; and
an optical layer disposed on the display panel,
wherein the display panel includes:
a base layer having a first area and a second area defined therein; and
a display element layer disposed on the base layer,
wherein the display element layer includes:
a plurality of light emitters respectively disposed in the plurality of light-emitting areas;
a first light sensor disposed in a first sensing area among the plurality of sensing areas and operating at a first operation frequency; and
a second light sensor disposed in a second sensing area among the plurality of sensing areas and operating at a second operation frequency higher than the first operation frequency,
wherein the optical layer includes a light-blocking layer disposed on the display panel, and the light-blocking layer includes:
a first opening disposed above the first light sensor; and
a second opening disposed above the second light sensor,
wherein a width of the first opening is less than a width of the second opening, and the first and second openings are spatially separate.

12. The display device of claim 11, further comprising:
a first color filter overlapping with the first light sensor in a plan view, the first color filter is configured to transmit light of a first wavelength band therethrough; and
a second color filter overlapping with the second light sensor in the plan view, the second color filter is configured to transmit light of a second wavelength band therethrough, wherein the first wavelength band is shorter than the second wavelength band.

13. The display device of claim 12, wherein:
the first wavelength band is in a range of about 380 nm to about 570 nm, and
the second wavelength band is in a range of about 600 nm to about 1000 μm.

14. The display device of claim 11, wherein an amount of light received by the second light sensor is greater than an amount of light received by the first light sensor.

15. The display device of claim 11, wherein a first resolution of a first image acquired by the first light sensor is higher than a second resolution of a second image acquired by the second light sensor.

16. The display device of claim 11, wherein:
the first operation frequency is in a range of about 1 Hz to about 10 Hz, and
the second operation frequency is in a range of about 30 Hz to about 500 Hz.

17. An electronic device comprising:
a plurality of pixels;
a first light sensor at a first position of a display area;
a second light sensor at a second position of the display area; and
a light-blocking layer disposed on the plurality of pixels and the first and second light sensors,
wherein the light-blocking layer includes:
a first opening disposed above the first; and
a second opening disposed above the second light sensor,
wherein a width of the first opening is less than a width of the second opening, and the first and second openings are spatially separate,
wherein the first light sensor is configured to be driven based on one or more first operating parameters and the second light sensor is configured to be driven based on one or more second operating parameters different from the one or more first operating parameters.

18. The electronic device of claim 17, wherein:
the one or more first operating parameters includes a first frequency, and
the one or more second operating parameters includes a second frequency different from the first frequency.

19. The electronic device of claim 18, wherein:
the first frequency corresponds to a still image, and
the second frequency corresponds to a moving image.

20. The electronic device of claim 18, wherein:
the first light sensor is configured to capture images at the first frequency, and
the second light sensor is configured to capture images at the second frequency which is greater than the first frequency.

21. The electronic device of claim 18, wherein:
the one or more first operating parameters include a first resolution, and
the one or more second operating parameters include a second resolution different from the first resolution.

22. The electronic device of claim 21, wherein the first light sensor is disposed to receive less light than the second light sensor.

23. The electronic device of claim 22, wherein:
the first light sensor is to detect biometric information, and
the second light sensor is to detect medical information of a user.

24. The electronic device of claim 23, wherein:
the biometric information includes a fingerprint, and
the medical information includes blood-based information.

* * * * *